United States Patent
Chiang et al.

(10) Patent No.: US 8,412,119 B2
(45) Date of Patent: Apr. 2, 2013

(54) EVALUATION DEVICE AND METHOD FOR PROVIDING A TRANSCEIVER SYSTEM WITH PERFORMANCE INFORMATION THEREOF

(75) Inventors: Ching-Tai Chiang, Dashu Township (TW); Rong-Ching Wu, Dashu Township (TW); Chen-Sen Ouyang, Dashu Township (TW); Jong-Ian Tsai, Dashu Township (TW)

(73) Assignee: I Shou University, Kaohsiung County (TW)

( * ) Notice: Subject to any disclaimer, the term of this patent is extended or adjusted under 35 U.S.C. 154(b) by 147 days.

(21) Appl. No.: 12/952,691

(22) Filed: Nov. 23, 2010

(65) Prior Publication Data

US 2011/0319033 A1  Dec. 29, 2011

(30) Foreign Application Priority Data

Jun. 29, 2010  (TW) ................................ 99121218 A

(51) Int. Cl.
*H04B 1/38* (2006.01)

(52) U.S. Cl. .................... 455/73; 455/67.11; 455/67.13; 375/227; 375/260

(58) Field of Classification Search ................. 455/63.1, 455/67.11, 67.13, 73, 562.1, 575.7; 375/227, 375/260
See application file for complete search history.

(56) References Cited

U.S. PATENT DOCUMENTS

2008/0205538 A1* 8/2008 Han et al. ...................... 375/267
2011/0261898 A1* 10/2011 Huang et al. .................. 375/295

* cited by examiner

*Primary Examiner* — Tuan H Nguyen
(74) *Attorney, Agent, or Firm* — Steptoe & Johnson LLP

(57) ABSTRACT

An evaluation device is adapted for providing a transceiver system with performance information thereof. The transceiver system models a channel between a transmitter and a receiver thereof using Nakagami distribution with a fading parameter. The evaluation device includes a threshold value computing module, a signal-to-noise ratio (SNR) setting module, a probability computing module, and an output module. The threshold value computing module is operable to compute a threshold value based upon a given capacity. The SNR setting module is operable to set an average SNR for the channel between the transmitter and the receiver of the transceiver system. The probability computing module is operable, based upon the fading parameter, the average SNR and the threshold value, to compute an outage probability of the transceiver system corresponding to the given capacity. The output module is operable to provide the transceiver system with the average SNR and the outage probability.

12 Claims, 6 Drawing Sheets

EVALUATION DEVICE AND METHOD FOR PROVIDING A TRANSCEIVER SYSTEM WITH PERFORMANCE INFORMATION THEREOF

BACKGROUND OF THE INVENTION

1. Field of the Invention

The present invention relates to an evaluation device and method for providing a transceiver system with performance information thereof, more particularly to an evaluation device and method for providing a transceiver system, which models a channel thereof using Nakagami distribution, with performance information thereof.

2. Description of the Related Art

Referring to FIG. 1, a multiuser transceiver system 900 under a transmit antenna selection/maximal-ratio combining (TAS/MRC) scheme includes a transmitter (Tx) and a plurality of receivers (Rx). The transmitter (Tx) includes a plurality of transmit antennas 93, and each of the receivers (Rx) includes a plurality of receive antennas 94. For example, the transmitter (Tx) is a base station capable of communication with the receivers (Rx), such as cell phones of users, under the TAS/MRC scheme.

Each of the receivers (Rx) is operable, in advance, to estimate the channels between the transmitter (Tx) and itself so as to determine which one of the transmit antennas 93 results in a channel that has relatively better performance. According to the evaluation results from the receivers (Rx), the transmitter (Tx) is operable to communicate with a selected one of the receivers (Rx), and to transmit signals to the selected one of the receivers (Rx) using one of the transmit antennas 93 corresponding to one of the channels that has relatively better performance. Then, the selected one of the receivers (Rx) is operable to weight the signals received by the receive antennas 94 thereof so as to optimize the performance of the transceiver system 900.

In "Outage probability of transmitter antenna selection/receiver-MRC over spatially correlated Nakagami-fading channels," *IEEE ICCT'06*, November 2006, pages 1-4, Wang B. Y. et al. proposed a method for evaluating performance of a transceiver system under the TAS/MRC scheme by using Nakagami channels associated with integer fading parameters to simulate an outage probability. However, when evaluations are conducted in a metropolis, the channels of the transceiver system usually fade in various levels. Therefore, the Nakagami channels only associated with integer fading parameters are inappropriate for simulation of masking, fading, or other interferences in a metropolis.

SUMMARY OF THE INVENTION

Therefore, an object of the present invention is to provide an evaluation device and method adapted for appropriately evaluating performance of a transceiver system by using Nakagami channels associated with fading parameters not limited to integers to compute an outage probability of the transceiver system.

Accordingly, an evaluation device of this invention is adapted for providing a transceiver system with performance information thereof. The transceiver system includes a transmitter and a receiver, and models a channel between the transmitter and the receiver using Nakagami distribution with a fading parameter. The evaluation device comprises a threshold value computing module, a signal-to-noise ration (SNR) setting module, a probability computing module, and an output module.

The threshold value computing module is operable to compute a threshold value based upon a given capacity. The SNR setting module is operable to set an average SNR for the channel between the transmitter and the receiver of the transceiver system. The probability computing module is operable, based upon the fading parameter, the average SNR and the threshold value, to compute an outage probability of the transceiver system corresponding to the given capacity. The output module is operable to provide the transceiver system with the average SNR and the outage probability as the performance information of the transceiver system.

According to another aspect, an evaluation method of this invention is adapted for providing a transceiver system with performance information thereof. The transceiver system includes a transmitter and a receiver, and models a channel between the transmitter and the receiver using Nakagami distribution with a fading parameter. The evaluation method is adapted to be implemented by an evaluation device, and comprises the steps of:

a) configuring the evaluation device to compute a threshold value based upon a given capacity;

b) configuring the evaluation device to set an average signal-to-noise ratio (SNR) for the channel between the transmitter and the receiver of the transceiver system;

c) based upon the fading parameter, the average SNR and the threshold value, configuring the evaluation device to compute an outage probability of the transceiver system corresponding to the given capacity; and d) configuring the evaluation device to provide the transceiver system with the average SNR and the outage probability as the performance information of the transceiver system.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
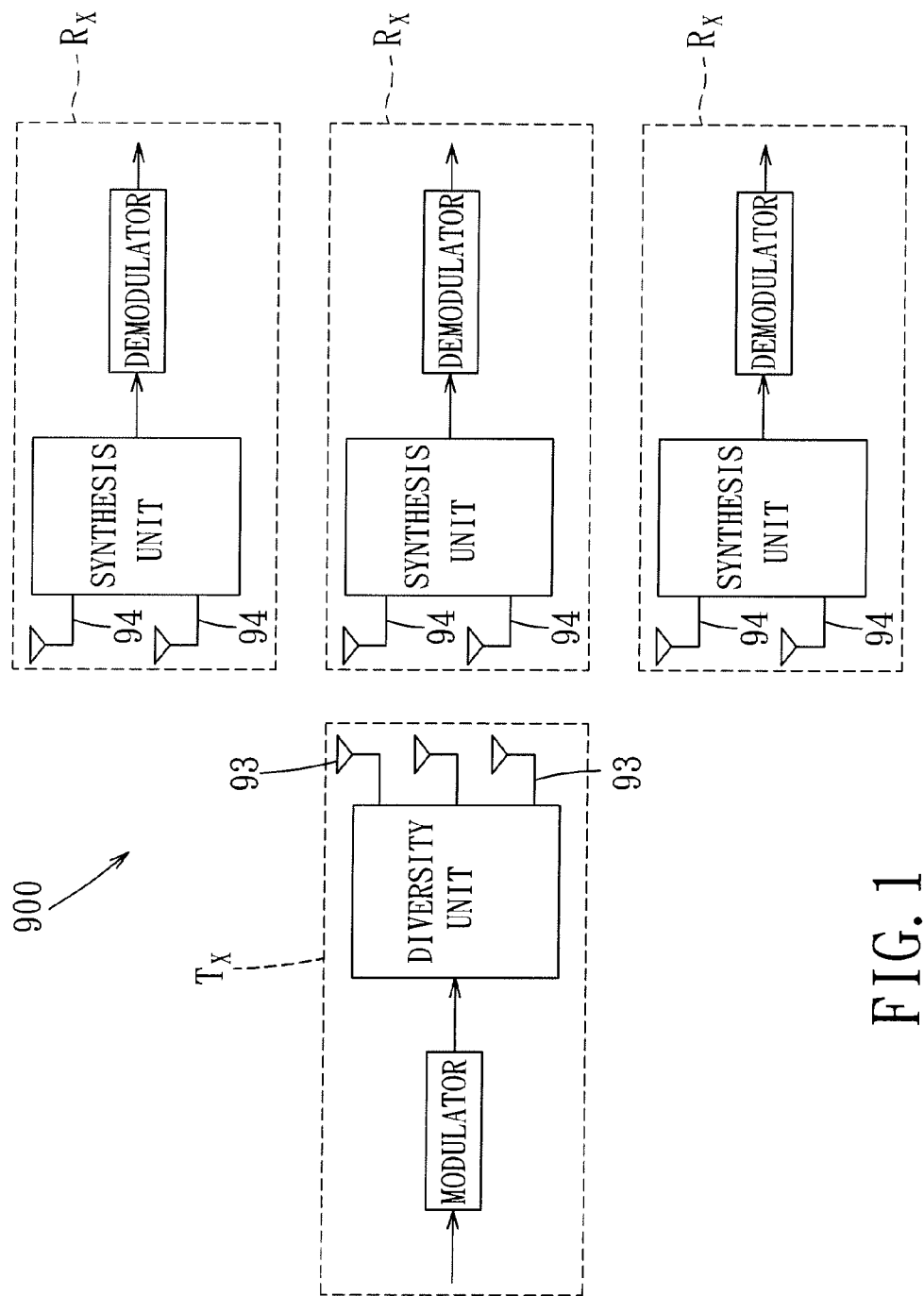
FIG. 1 is a block diagram illustrating a conventional transceiver system.
Figure 2:
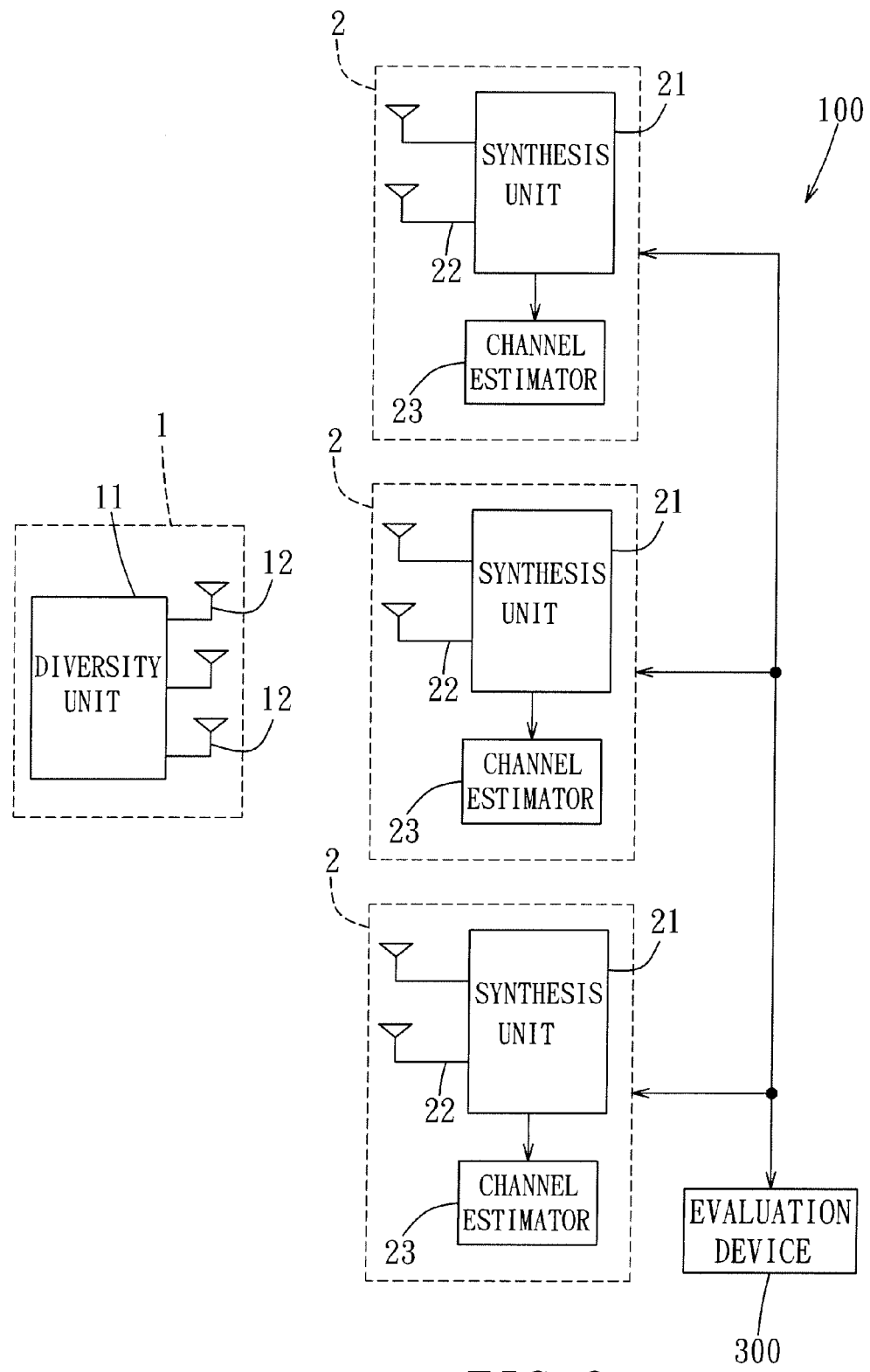
FIG. 2 is a block diagram of a transceiver system associated with the preferred embodiment of an evaluation device of this invention.

Referring to FIG. 2, a multiuser transceiver system 100 under a transmit antenna selection/maximal-ratio combining (TAS/MRC) scheme includes a transmitter 1 and a number K (K>1) of receivers 2. In practice, the transmitter 1 is a base station, and each of the receivers 2 is a cell phone of a user. The transmitter 1 includes a diversity unit 11 and a number $L_T$ ($L_T$>1) of transmit antennas 12. Each of the receivers 2 includes a number $L_R$ ($L_R$>1) of receive antennas 22, a synthesis unit 21, and a channel estimator 23. For illustrative purpose, in FIG. 2, the transceiver system 100 includes three (K=3) of the receivers 2 each of which includes two ($L_R$=2) of the receive antennas 22, and the transmitter 1 includes three ($L_T$=3) of the transmit antennas 12.

In such a TAS/MRC scheme, there are a number $L_T \times L_R$ of possible channels for each of the receivers 2, and each of the channels is defined by one of the transmit antennas 12 and one of the receive antennas 22. The channel estimator 23 of each of the receivers 2 is operable to provide the transmitter 1 with transmission qualities of the possible channels corresponding to each of the receivers 2. Then, according to the transmission qualities, the diversity unit 11 of the transmitter 1 is operable to determine which one of the receivers 2 will be selected as a communication target, and to determine which one of the transmit antennas 12 will be used to transmit signals. The diversity unit 11 is further operable to transmit the signals to a selected one of the transmit antennas 12 for transmission of the signals to the communication target. It should be noted that the communication target is one of the receivers 2 that demonstrates the greatest transmission quality with the transmitter 1, and the selected one of the transmit antennas 12 is capable of reaching such transmission quality.

After the selected one of the receivers 2, which is selected as the communication target, receives the signal from the transmitter 1 through the receive antennas 22 thereof, the signals are transmitted to the synthesis unit 21 of the selected one of the receivers 2. According to the transmission qualities of the channels between the selected one of the transmit antennas 12 and the receive antennas 22, the synthesis unit 21 is operable to weight the signals received by the receive antennas 22 so as to obtain a synthesized signal.

In "A unified capacity analysis for wireless systems with joint multiuser scheduling and antenna diversity in Nakagami fading channels," *IEEE Trans. Commun.*, March 2006, 54, (3), pages 469-478, Chen C. J. et al. disclosed the use of Nakagami distribution (see FIG. 3) to model each of the channels between the selected one of the transmit antennas 12 and respective one of the receive antennas 22 of the communication target. It is assumed that each of the channels has a same average signal-to-noise ratio (SNR). Therefore, probability distribution of the SNR of the synthesized signal may be expressed as Equation (1) by a probability density function of SNR (Q).

$$p(Q) = \frac{KL_T}{[\Gamma(mL_R)]^{KL_T}} \left(\frac{m}{\overline{Q}}\right)^{mL_R} Q^{mL_R - 1} \exp\left(-\frac{mQ}{\overline{Q}}\right) \left[\gamma\left(mL_R, \frac{mQ}{\overline{Q}}\right)\right]^{KL_T - 1} \quad (1)$$

In Equation (1), m is a fading parameter of Nakagami distribution, $\overline{Q}$ is the average SNR of the channels, $\Gamma(z)$ is a Gamma function ($\Gamma(z) = \int_0^\infty t^{z-1} e^{-t} dt$) for an arbitrary positive number z, and $\gamma(\ )$ is an incomplete Gamma function. The Gamma function $\Gamma(z)$ and the incomplete Gamma function $\gamma(\ )$ may be respectively referred to Equations (8.310.1) and (8.350.1) in "*Table of Integrals, Series, and Products*" (Academic Press, New York, 1994, 5$^{th}$ edition).

Further, in "Outage probability study of multiuser diversity in MIMO transmit antenna selection systems," *IEEE Signal Process. Lett.*, 2007, 14, (3), pages 161-164, Zhang X. proposed an outage probability $P_{out}$ as expressed in Equation (2) for indicating the probability that an instantaneous capacity of the transceiver system 100 is less than a given capacity R when the SNR of the synthesized signal is equal to Q.

$$P_{out} = \int_0^\lambda p(Q) dQ \quad (2)$$

In Equation (2), $\lambda$ is a threshold value, and is computed based upon $\lambda = 2^R - 1$.

Figure 3:
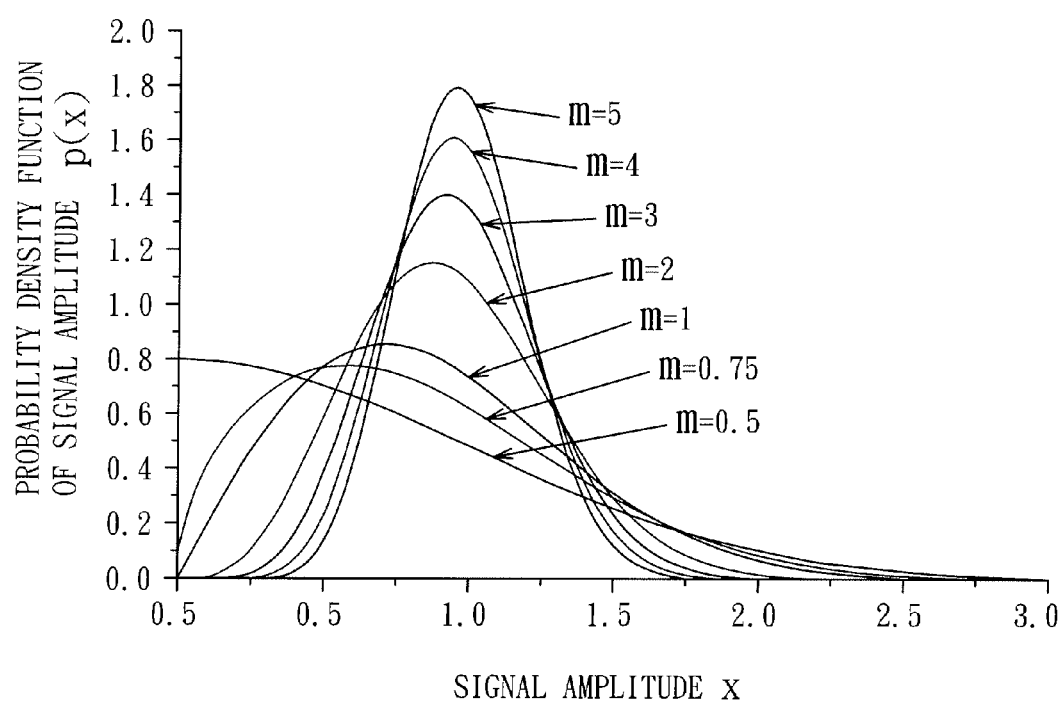
FIG. 3 is a plot to illustrate Nakagami distribution.

It should be noted that, in FIG. 3, the fading parameter m associated with Nagakami distribution in this embodiment may be an arbitrary positive number, and different values of the fading parameter m may correspond to different levels of channel fading.

Further, referring to Equations (8.352.1), (8.351.2), (9.14.1) and (0.314) in "*Table of Integrals, Series, and Products*," the term $$\left[\gamma\left(mL_R, \frac{mQ}{\overline{Q}}\right)\right]^{KL_T - 1}$$

in Equation (1) can be represented by the following Equation (3) for the fading parameter m that is greater than or equal to ½, and Equation (4) for the fading parameter m that is a positive integer.

$$\left[\gamma\left(mL_R, \frac{mQ}{\overline{Q}}\right)\right]^{KL_T - 1} = \quad (3)$$

$$\sum_{n=0}^{\infty} \alpha_n \left(\frac{mQ}{\overline{Q}}\right)^{mL_R(KL_T - 1) + n} \exp\left(-\frac{mQ(KL_T - 1)}{\overline{Q}}\right)$$

$$\left[\gamma\left(mL_R, \frac{mQ}{\overline{Q}}\right)\right]^{KL_T - 1} = \quad (4)$$

$$\left[\Gamma(mL_R)\left(1 - \exp\left(-\frac{mQ}{\overline{Q}}\right) \sum_{t=0}^{mL_R - 1} \frac{1}{t!}\left(\frac{mQ}{\overline{Q}}\right)^t\right)\right]^{KL_T - 1}$$

In Equations (3) and (4), $Z! = (Z-1) \cdot (Z-2) \cdot \ldots \cdot 1$, $$\alpha_0 = \left(\frac{1}{mL_R}\right)^{KL_T - 1}, \text{ and } \alpha_n = \frac{\Gamma(mL_R + 1)}{n} \sum_{j=1}^n \frac{jKL_T - n}{\Gamma(mL_R + 1 + j)} \alpha_{n-j}$$

for a positive integer n. It could be appreciated from the foregoing that $\alpha_n$ are a sequence of rapidly decreasing convergent numbers, that is to say, $\alpha_{n-1}$ is much greater than $\alpha_n$.

From Equation (3), when the fading parameter m is greater than or equal to ½, the outage probability expressed in Equation (2) can be rearranged as $$P_{out} = \int_0^\lambda p(Q) dQ \quad (5)$$

$$= \frac{1}{[\Gamma(mL_R)]^{KL_T}} \sum_{n=0}^{\infty} \alpha_n \frac{\gamma\left(mKL_R L_T + n\frac{mKL_T}{\overline{Q}}\lambda\right)}{(KL_T)^{nKL_R L_T + n - 1}}$$

In "Error Performance of Maximal-Ration Combining with Transmit Antenna Selection in Flat Nakagami-m Fading Channels," *IEEE Trans. Wireless Commun.*, Jan. 2009, 8, (1), pages 424-431, Chen Z. et al. noted that when the average SNR $\overline{Q}$ is much greater than 1, i.e., greater than a predetermined value, the incomplete Gamma function $\gamma(\ )$ in Equation (5) can be expressed as $$\gamma\left(mKL_TL_R + n, \frac{mKL_T}{\overline{Q}}\lambda\right) \approx \frac{(mKL_T\lambda)^{nKL_TL_R}}{mKL_TL_R}\overline{Q}^{-mKL_TL_R}, \text{ for } n = 0. \quad (6)$$

Since $\alpha_0$ is relatively much greater as described in the foregoing, Equation (5) can be simplified, based upon Equation (6), as $$P_{out} \approx \frac{(m\lambda)^{nKL_TL_R}}{[\Gamma(mL_R+1)]^{KL_T}}\overline{Q}^{-mKL_TL_R}. \quad (7)$$

For the procedure of the simplification, one can refer to "A simple and general parameterization quantifying performance in fading channels," *IEEE Trans. Commun.*, August 2003, 51, (8), pages 1389-1398.

From Equation (4), when the fading parameter m is a positive integer, the outage probability expressed in Equation (2) can be rearranged as $$P_{out} = \int_0^\lambda p(Q)dQ \quad (8)$$

$$= \frac{KL_T}{(mL_R-1)!}\sum_{j=0}^{KL_T-1}$$

$$\left\{\begin{bmatrix}\binom{KL_T-1}{j}(-1)^j\sum_{t=0}^{j(mL_R-t)}\beta_t\\ \left[\frac{(mL_R+t-1)!}{(j+1)^{mL_R+t}} -\right.\\ \left.\exp\left(-\frac{m(j+1)}{\overline{Q}}\lambda\right)\times\right.\\ \left.\sum_{n=0}^{mL_R+t-1}\frac{(mL_R+t-n-1)!}{(j+1)^{mL_R+t-n}}\right.\\ \left.\binom{mL_R+t-1}{n}\left(\frac{m}{\overline{Q}}\lambda\right)^n\right]\end{bmatrix}\right\}$$

where, $$\beta_0 = 1, \beta_t = \frac{1}{t}\sum_{k=1}^{min(t,mL_R-1)}\frac{k(j+1)-t}{k!}\beta_{t-k}$$

for a positive integer t, and $$\binom{X}{Y} = \frac{X!}{Y!(X-Y)!}$$

for positive integers X, Y and Z.

Figure 4:
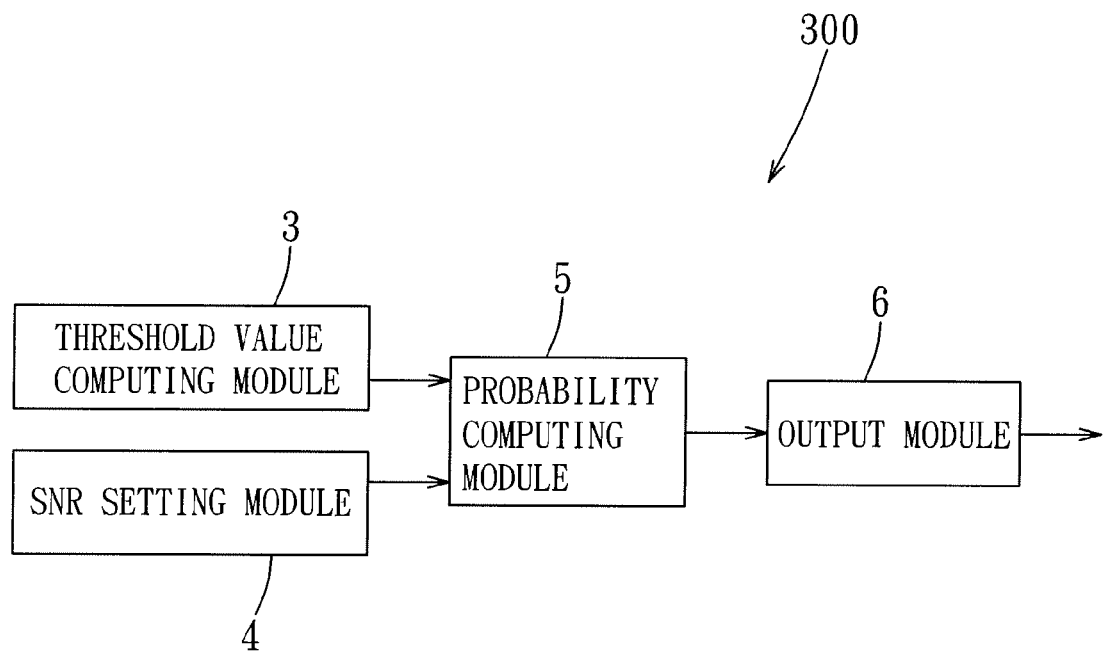
FIG. 4 is a block diagram of the evaluation device of the preferred embodiment.

Referring to FIGS. 2 and 4, the preferred embodiment of an evaluation device 300 of this invention is adapted for analyzing the synthesizing signal from the synthesis unit 21 so as to provide the transceiver system 100 with performance information of the transceiver system 100. The evaluation device 300 includes a threshold value computing module 3, an SNR setting module 4, a probability computing module 5 coupled to the threshold value computing module 3 and the SNR setting module 4, and an output module 6 coupled to the probability computing module 5.

The threshold value computing module 3 is operable to compute the threshold value $\lambda$ based upon the given capacity R. The SNR setting module 4 is operable to set the average SNR $\overline{Q}$ for each of the channels between the transmitter 1 and the receivers 2. The probability computing module 5 is operable, based upon the fading parameter m, the average SNR $\overline{Q}$ and the threshold value $\lambda$, to compute the outage probability $P_{out}$ of the transceiver system 100 corresponding to the given capacity R. Then, the output module 6 is operable to provide the transceiver system 100 with the average SNR $\overline{Q}$ and the outage probability $P_{out}$ as the performance information of the transceiver system 100.

Figure 5:
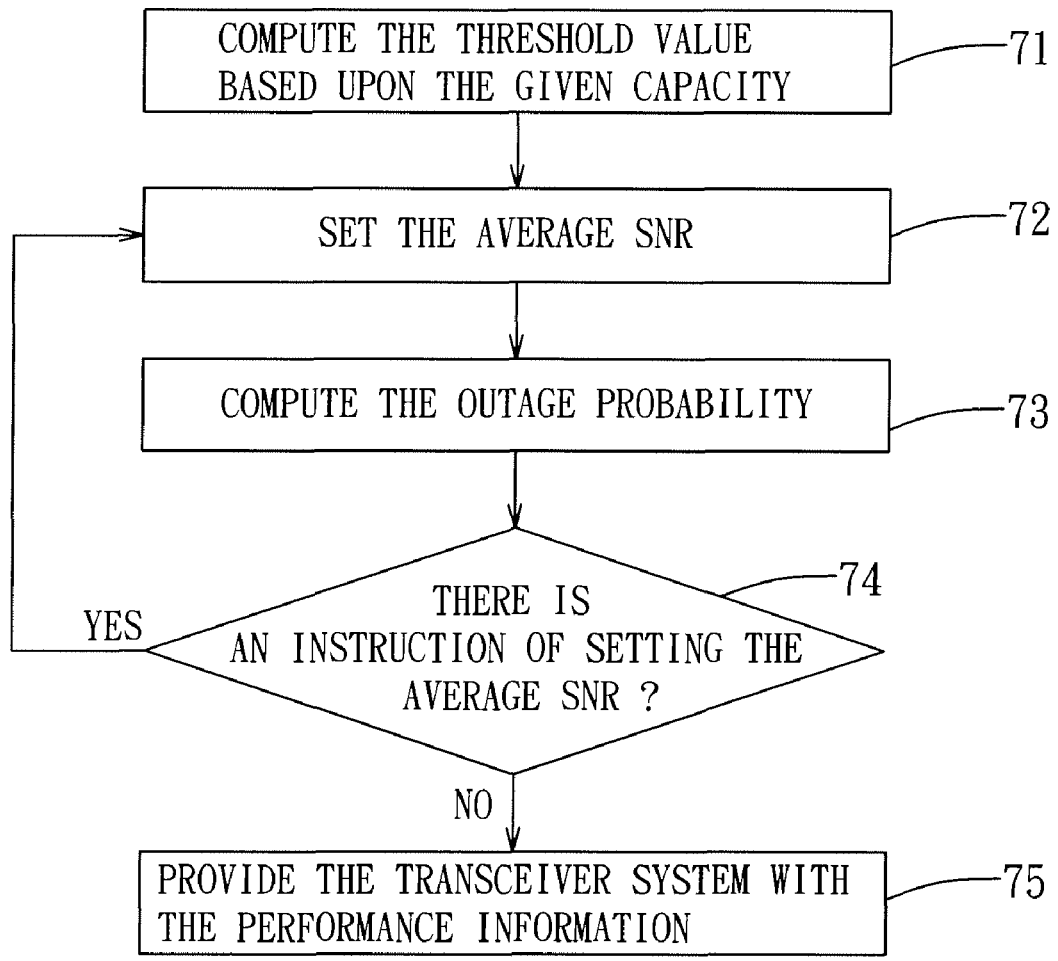
FIG. 5 is a flow chart illustrating the preferred embodiment of an evaluation method of the present invention.

FIG. 5 shows a flow chart of the preferred embodiment of an evaluation method that is adapted to be implemented by the evaluation device 300. The evaluation method includes the following steps.

In step 71, the threshold value computing module 3 is operable to compute the threshold value $\lambda$ based upon $\lambda = 2^R - 1$.

In step 72, the SNR setting module 4 is operable to set each of the channels with the same average SNR $\overline{Q}$.

In step 73, the probability computing module 5 is operable to compute the outage probability $P_{out}$ of the transceiver system 100.

In practice, the probability computing module 5 is operable in advance to determine whether the fading parameter m is a positive integer. The probability computing module 5 is operable to compute the outage probability $P_{out}$ based upon Equation (8) when the determination is affirmative, and to compute the outage probability $P_{out}$ based upon Equation (5) or (7) when otherwise. In particular, when the fading parameter m is not a positive integer, the probability computing module 5 is operable to compute the outage probability $P_{out}$ based upon Equation (7) while the average SNR $\overline{Q}$ is greater than a predetermined value, and to compute the outage probability $P_{out}$ based upon Equation (5) while the average SNR $\overline{Q}$ is not greater than the predetermined value. Further, in practice, it is impractical to calculate the summation of the infinite series $$(\sum_{n=0}^{\infty})$$

in Equation (5). Therefore, the probability computing module 5 is operable to count a limited number of the series. In this embodiment, the probability computing module 5 is operable to count the series for n=0~50 when computing the summation.

From Equations (5) to (8), it can be appreciated that the probability computing module 5 computes the outage probability $P_{out}$ based upon the threshold value $\lambda$, the average SNR $\overline{Q}$, the fading parameter m, the number $L_T$ of the transmit antennas 12, the number $L_R$ of the receive antennas 22, and the number K of the receivers 2. Certainly, in other embodiments, the probability computing module 5 may be operable in advance to determine whether the fading parameter m is greater than or equal to ½, and to compute the outage probability $P_{out}$ based upon Equation (5) or (7) when affirmative.

In step 74, the output module 6 is operable to determine whether there is an instruction of setting another average SNR. The flow goes back step 72 when the determination is affirmative, and goes to step 75 when otherwise.

In step 75, the output module 6 is operable to provide the transceiver system 100 with the outage probability $P_{out}$ corresponding to each of the average SNRs $\overline{Q}$ set in step 72 as the performance information of the transceiver system 100.

Figure 6:
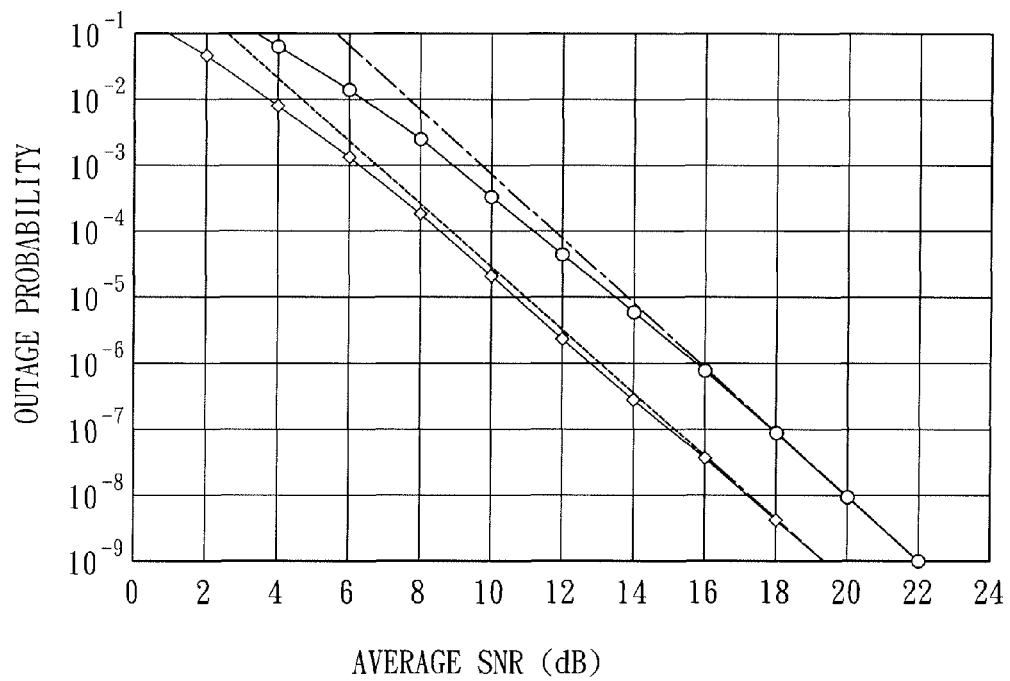
FIG. 6 is a simulation plot for illustrating a relationship between an average signal-to-noise ratio and an outage probability.

Taking FIG. 6 as an example, it is assumed that R=2, K=2, and m=0.6, and optimal outage probabilities $P_{out}$ are computed based upon Equation (5). The symbols ◇ represent the outage probabilities $P_{out}$ when $L_T$=1 and $L_R$=4, and the symbols ○ represent the outage probabilities $P_{out}$ when $L_T$=4 and $L_R$=1. Further, Equation (7) is used to approximately compute the outage probabilities $P_{out}$. The dashed line "---" represents the outage probabilities $P_{out}$ when $L_T$=1 and $L_R$=4, and the dashed line "---" represents the outage probabilities $P_{out}$ when $L_T$=4 and $L_R$=1.

In FIG. 6, it is appreciated that the results computed according to Equation (7) are relatively approximate to the results computed according to Equation (5) when the average SNRs $\overline{Q}$ are relatively greater. Moreover, in the condition of a constant value of the given capacity R, the outage probabilities $P_{out}$ increase with the average SNRs $\overline{Q}$, that is to say, transmission error of the transceiver system 100 decreases and the performance thereof is relatively better.

It should be noted that, in other embodiments, the transmitter 1 may include only one transmit antenna 12, and each of the receivers 2 may include only one receive antenna 22. Thus, the synthesis unit 21 of each of the receivers 2 could be omitted, and the evaluation device 300 directly analyzes the signal received from the receive antenna 22. Further, Equations (5) to (8) are still practical when the number of the receivers 2 is equal to 1 (K=1).

In this embodiment, the fading parameter m of Nakagami channels is not limited to a positive integer. The probability computing module 5 is capable of computing the outage probability $P_{out}$ with the fading parameter m that is an arbitrary positive integer, or that is equal to or greater than ½. Therefore, the evaluation device 300 according to this invention is suitable for simulation of the channels of the transceiver system 100 with various fading levels in a metropolis.

In conclusion, the evaluation device 300 according to the present invention is capable of computing the outage probability $P_{out}$ corresponding to the given capacity R once the threshold value λ is obtained from the given capacity R. Moreover, the evaluation method implemented by the evaluation device 300 is adapted for computing the outage probability $P_{out}$ corresponding to the Nakagami channels with arbitrary positive fading parameter m. Therefore, the evaluation device 300 according to this invention is suitable for simulating the performance of the transceiver system 100 in a metropolis.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An evaluation device adapted for providing a transceiver system with performance information thereof, the transceiver system including a transmitter and a receiver and modeling a channel between the transmitter and the receiver using Nakagami distribution with a fading parameter, the transmitter having a plurality of transmit antennas, the receiver having a plurality of receive antennas, said evaluation device comprising:
   a threshold value computing module operable to compute a threshold value based upon a given capacity;
   a signal-to-noise ratio (SNR) setting module operable to set an average SNR for the channel between the transmitter and the receiver of the transceiver system;
   a probability computing module operable, based upon the fading parameter, a number of the transmit antennas, a number of the receive antennas, the average SNR and the threshold value, to compute an outage probability of the transceiver system corresponding to the given capacity; and
   an output module operable to provide the transceiver system with the average SNR and the outage probability as the performance information of the transceiver system.

2. The evaluation device as claimed in claim 1, the transceiver system including a number $L_T$ of the transmit antennas and a number K of the receivers each of which has a number $L_R$ of the receive antennas, wherein
   when the fading parameter m is greater than or equal to ½, said probability computing module is operable to compute the outage probability $P_{out}$ based upon $$P_{out} = \frac{1}{[\Gamma(mL_R)]^{KL_T}} \sum_{n=0}^{n'} \alpha_n \frac{\gamma\left(mKL_RL_T + n, \frac{mKL_T}{\overline{Q}}\lambda\right)}{(KL_T)^{mKL_RL_T+n-1}},$$

where $\overline{Q}$ is the average SNR, λ is the threshold value, n' is a predetermined integer, $\gamma()$ is an incomplete Gamma function, $\Gamma(z)=\int_0^\infty t^{z-1}e^{-t}dt$ for an arbitrary positive number z, $$\alpha_0 = \left(\frac{1}{mL_R}\right)^{KL_T-1}, \text{ and } \alpha_n = \frac{\Gamma(mL_R+1)}{n} \sum_{j=1}^{n} \frac{jKL_T - n}{\Gamma(mL_R+1+j)} \alpha_{n-j}$$

for a positive integer n.

3. The evaluation device as claimed in claim 1, the transceiver system including a number $L_T$ of the transmit antennas and a number K of the receivers each of which has a number $L_R$ of the receive antennas, wherein
   when the fading parameter m is greater than or equal to ½, and the average SNR is greater than a predetermined value, said probability computing module is operable to compute the outage probability $P_{out}$ based upon $$P_{out} \approx \frac{(m\lambda)^{mKL_TL_T}}{[\Gamma(mL_R+1)]^{KL_T}} \overline{Q}^{-mKL_TL_R},$$

where $\overline{Q}$ is the average SNR, λ is the threshold value, and $\Gamma(z)=\int_0^\infty t^{z-1}e^{-t}dt$ for an arbitrary positive number z.

4. The evaluation device as claimed in claim 1, the transceiver system including a number $L_T$ of the transmit antennas and a number K of the receivers each of which has a number $L_R$ of the receive antennas, wherein
   when the fading parameter m is greater than or equal to ½, said probability computing module is operable to compute the outage probability $P_{out}$ based upon:

$$P_{out} = \frac{1}{[\Gamma(mL_R)]^{KL_T}} \sum_{n=0}^{n'} \alpha_n \frac{\gamma\left(mKL_RL_T + n, \frac{mKL_T}{\overline{Q}}\lambda\right)}{(KL_T)^{mKL_RL_T+n-1}},$$

while the average SNR is not greater than a predetermined value; and $$P_{out} \approx \frac{(m\lambda)^{mKL_TL_R}}{[\Gamma(mL_R+1)]^{KL_T}} \overline{Q}^{-mKL_TL_R},$$

while the average SNR is greater than the predetermined value;

where $\overline{Q}$ is the average SNR, $\lambda$ is the threshold value, n' is a predetermined integer, $\gamma(\ )$ is an incomplete Gamma function, $\Gamma(z)=\int_0^\infty t^{z-1}e^{-t}dt$ for an arbitrary positive number z, $$\alpha_0 = \left(\frac{1}{mL_R}\right)^{KL_T-1}, \text{ and } \alpha_n = \frac{\Gamma(mL_R+1)}{n} \sum_{j=1}^{n} \frac{jKL_T-n}{\Gamma(mL_R+1+j)} \alpha_{n-j}$$

for a positive integer n.

5. The evaluation device as claimed in claim 1, the transceiver system including a number $L_T$ of the transmit antennas and a number K of the receivers each of which has a number $L_R$ of the receive antennas, wherein when the fading parameter m is a positive integer, said probability computing module is operable to compute the outage probability $P_{out}$ based upon $$P_{out} = \frac{KL_T}{(mL_R-1)!} \sum_{j=0}^{KL_T-1} \left\{ \binom{KL_T-1}{j}(-1)^j \right.$$
$$\sum_{t=0}^{j(mL_R-1)} \beta_t \left[\frac{(mL_R+t-1)!}{(j+1)^{mL_R+t}} - \exp\left(-\frac{m(j+1)}{\overline{Q}}\lambda\right) \times \right.$$
$$\left.\left.\sum_{n=0}^{mL_R+t-1} \frac{(mL_R+t-n-1)!}{(j+1)^{mL_R+t-n}} \binom{mL_R+t-1}{n}\left(\frac{m}{\overline{Q}}\lambda\right)^n \right]\right\},$$

where $\overline{Q}$ is the average SNR, $\lambda$ is the threshold value, $$Z! = (Z-1)\cdot(Z-2)\cdot\ldots\cdot 1, \beta_0 = 1, \beta_t = \frac{1}{t}\sum_{k=1}^{\min(t,mL_R-1)} \frac{k(j+1)-t}{k!}\beta_{t-k}$$

for a positive integer t, and $$\binom{X}{Y} = \frac{X!}{Y!(X-Y)!}$$

for positive integers X, Y and Z.

6. The evaluation device as claimed in claim 1, wherein said threshold value computing module is operable to compute the threshold value $\lambda$ based upon $\lambda=2^R-1$, where R is the given capacity.

7. An evaluation method for providing a transceiver system with performance information thereof, the transceiver system including a transmitter and a receiver and modeling a channel between the transmitter and the receiver using Nakagami distribution with a fading parameter, the transmitter having a plurality of transmit antennas, the receiver having a plurality of receive antennas, said evaluation method being adapted to be implemented by an evaluation device and comprising the steps of:

a) configuring the evaluation device to compute a threshold value based upon a given capacity;
b) configuring the evaluation device to set an average signal-to-noise ratio (SNR) for the channel between the transmitter and the receiver of the transceiver system;
c) based upon the fading parameter, a number of the transmit antennas, a number of the receive antennas, the average SNR and the threshold value, configuring the evaluation device to compute an outage probability of the transceiver system corresponding to the given capacity; and
d) configuring the evaluation device to provide the transceiver system with the average SNR and the outage probability as the performance information of the transceiver system.

8. The evaluation method as claimed in claim 7, the transceiver system including a number $L_T$ of the transmit antennas and a number K of the receivers each of which has a number $L_R$ of the receive antennas, wherein in step c), when the fading parameter m is greater than or equal to ½, the evaluation device is configured to compute the outage probability $P_{out}$ based upon $$P_{out} = \frac{1}{[\Gamma(mL_R)]^{KL_T}} \sum_{n=0}^{n'} \alpha_n \frac{\gamma\left(mKL_RL_T+n, \frac{mKL_T}{\overline{Q}}\lambda\right)}{(KL_T)^{mKL_RL_T+n-1}},$$

where $\overline{Q}$ is the average SNR, $\lambda$ is the threshold value, n' is a predetermined integer, $\gamma(\ )$ is an incomplete Gamma function, $\Gamma(z)=\int_0^\infty t^{z-1}e^{-t}dt$ for an arbitrary positive number z, $$\alpha_0 = \left(\frac{1}{mL_R}\right)^{KL_T-1}, \text{ and } \alpha_n = \frac{\Gamma(mL_R+1)}{n} \sum_{j=1}^{n} \frac{jKL_T-n}{\Gamma(mL_R+1+j)} \alpha_{n-j}$$

for a positive integer n.

9. The evaluation method as claimed in claim 7, the transceiver system including a number $L_T$ of the transmit antennas and a number K of the receivers each of which has a number $L_R$ of the receive antennas, wherein in step c), when the fading parameter m is greater than or equal to ½, and the average SNR is greater than a predetermined value, the evaluation device is configured to compute the outage probability $P_{out}$ based upon $$P_{out} \approx \frac{(m\lambda)^{mKL_TL_R}}{[\Gamma(mL_R+1)]^{KL_T}} \overline{Q}^{-mKL_TL_R},$$

where $\overline{Q}$ is the average SNR, $\lambda$ is the threshold value, and $\Gamma(z)=\int_0^\infty t^{z-1}e^{-t}dt$ for an arbitrary positive number z.

10. The evaluation method as claimed in claim 7, the transceiver system including a number $L_T$ of the transmit antennas and a number K of the receivers each of which has a number $L_R$ of the receive antennas, wherein when the fading parameter m is greater than or equal to ½, the evaluation device is configured, in step c), to compute the outage probability $P_{out}$ based upon:

$$P_{out} = \frac{1}{[\Gamma(mL_R)]^{KL_T}} \sum_{n=0}^{n'} \alpha_n \frac{\gamma\left(mKL_RL_T + n, \frac{mKL_T}{\overline{Q}}\lambda\right)}{(KL_T)^{mKL_RL_T+n-1}},$$

while the average SNR is not greater than a predetermined value; and $$P_{out} \approx \frac{(m\lambda)^{mKL_TL_R}}{[\Gamma(mL_R+1)]^{KL_T}} \overline{Q}^{-mKL_TL_R},$$

while the average SNR is greater than the predetermined value;
where $\overline{Q}$ is the average SNR, $\lambda$ is the threshold value, n' is a predetermined integer, $\gamma(\ )$ is an incomplete Gamma function, $\Gamma(z)=\int_0^\infty t^{z-1}e^{-t}dt$ for an arbitrary positive number $$z, \alpha_0 = \left(\frac{1}{mL_R}\right)^{KL_T-1}, \text{ and } \alpha_n = \frac{\Gamma(mL_R+1)}{n} \sum_{j=1}^{n} \frac{jKL_T - n}{\Gamma(mL_R+1+j)} \alpha_{n-j}$$

for a positive integer n.

11. The evaluation method as claimed in claim 7, the transceiver system including a number $L_T$ of the transmit antennas and a number K of the receivers each of which has a number $L_R$ of the receive antennas, wherein
in step c), when the fading parameter m is a positive integer, the evaluation device is configured to compute the outage probability $P_{out}$ based upon $$P_{out} = \frac{KL_T}{(mL_R-1)!} \sum_{j=0}^{KL_T-1} \left\{ \binom{KL_T-1}{j}(-1)^j \right.$$

$$\sum_{t=0}^{j(mL_R-1)} \beta_t \left[ \frac{(mL_R+t-1)!}{(j+1)^{mL_R+t}} - \exp\left(-\frac{m(j+1)}{\overline{Q}}\lambda\right) \times \right.$$

$$\left. \left. \sum_{n=0}^{mL_R+t-1} \frac{(mL_R+t-n-1)!}{(j+1)^{mL_R+t-n}} \binom{mL_R+t-1}{n}\left(\frac{m}{\overline{Q}}\lambda\right)^n \right] \right\},$$

where $\overline{Q}$ is the average SNR, $\lambda$ is the threshold value, $$Z! = (Z-1)\cdot(Z-2)\cdot\ldots\cdot 1, \beta_0 = 1, \beta_t = \frac{1}{t}\sum_{k=1}^{min(t,mL_R-1)} \frac{k(j+1)-t}{k!}\beta_{t-k}$$

for a positive integer t, and $$\binom{X}{Y} = \frac{X!}{Y!(X-Y)!}$$

for positive integers X, Y and Z.

12. The evaluation method as claimed in claim 7, wherein, in step a), the evaluation device is configured to compute the threshold value $\lambda$ based upon $\lambda=2^R-1$, where R is the given capacity.

* * * * *